No. 885,210. PATENTED APR. 21, 1908.
E. F. WRENCH.
CLOTHES LINE REEL.
APPLICATION FILED SEPT. 29, 1905.

WITNESSES
Rich. A. George
E. P. De Giorgi

INVENTOR
EDWARD F. WRENCH
By Risley & Love
ATTORNEYS.

UNITED STATES PATENT OFFICE.

EDWARD F. WRENCH, OF WHITESBORO, NEW YORK, ASSIGNOR OF ONE-FOURTH TO ADDISON M. WRENCH, OF TELLURIDE, COLORADO, ONE-FOURTH TO BERNARD P. WRENCH, OF YORKVILLE, NEW YORK, AND ONE-SIXTH TO WILLIAM T. WELDEN AND ONE-SIXTH TO WILLARD G. BULLION, OF RICHFIELD SPRINGS, NEW YORK.

CLOTHES-LINE REEL.

No. 885,210.    Specification of Letters Patent.    Patented April 21, 1908.

Application filed September 29, 1905. Serial No. 280,589.

*To all whom it may concern:*

Be it known that I, EDWARD F. WRENCH, a citizen of the United States, residing at Whitesboro, in the county of Oneida and State of New York, have invented certain new and useful Improvements in Clothes-Line Reels, of which the following is a specification, reference being had therein to the accompanying drawing.

My invention relates to an improved clothes line reel, and I declare that the following is a full, clear, concise and exact description thereof sufficient to enable one skilled in the art to make and use the same, reference being had to the accompanying drawings in which like letters and figures have reference to like parts throughout.

My invention comprises a bracket and a reel removably mounted therein and capable of being reversed in such mounting, together with a single means of holding the reel in its mounting, and means for holding the reel in a given position.

Figure 5:
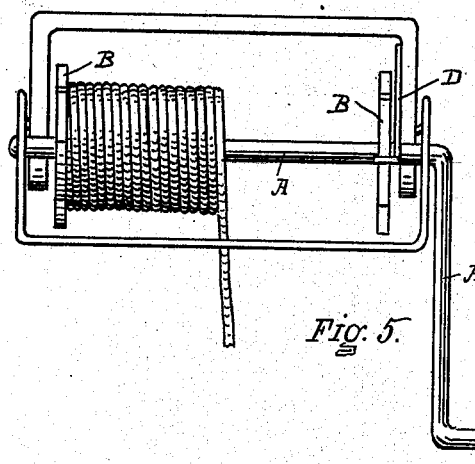
Figure 6:
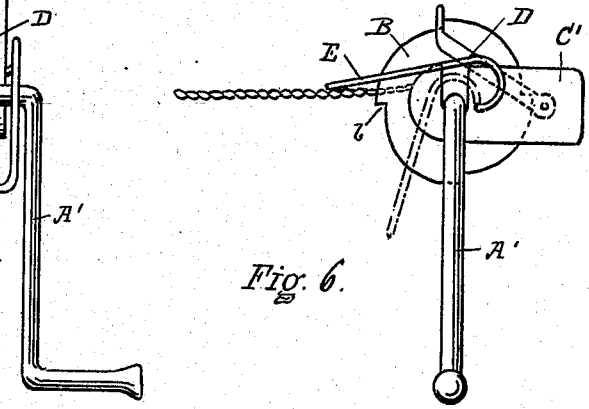
Figure 1:
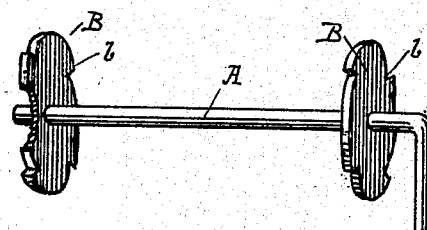
Figure 2:
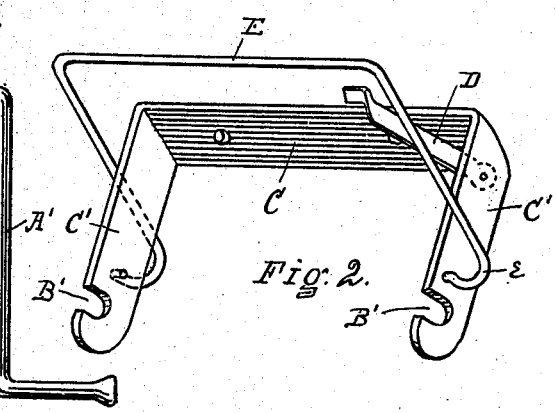
Figure 3:
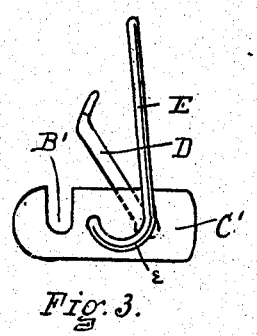
Figure 4:
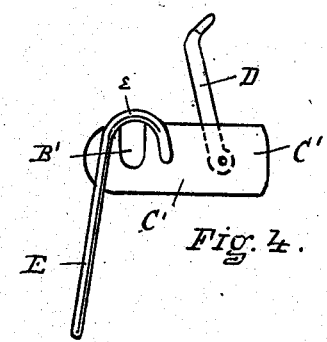

In the drawing Figure 1 is a perspective view of the reel, a portion being cut away and Fig. 2 is a perspective view of the bracket and Figs. 3 and 4 are side views of the bracket with the adjustable parts thereof in different positions. Figs. 5 and 6 are respectively top and end views of the device.

Referring to the drawings in detail A represents the shaft of the reel which is extended beyond the disks of the reel, on one end to form a journal and on the other to form the journal and handle A'.

On the shaft are the disks B which I prefer to make integral with the shaft in a single casting and which disks have notches $b$, for the engagement of the catch to be described. The notches on one disk are cut with a different slant than those on the other disk so that the reel may be held by the dog when reversed in its bearings in the bracket.

Fig. 2 shows the bracket in perspective. It comprises a portion C which is adapted to be screwed or otherwise fixed to the building or post and has forwardly projecting arms C', at the outer ends of which are slots B' forming bearings to receive the shaft of the reel portion permitting the free turning of the reel in the bracket support.

The bracket may be secured, for instance, to a corner of a house, and to adapt the device to different conditions the reel is constructed so that it may either be right-handed or left-handed.

The reel is mounted in the bracket by resting the journals in slots B' as will be readily seen but when it is in the bracket the turning of the reel may tend to lift it out. To obviate this I use a bent wire E pivoted at its ends in the ends of the bracket, and which curve so that it can be swung downward as shown in Fig. 4, the curved portions securing the axis or shaft of the reel in the slots B'.

Means have been used before to hold a reel in a bracket but my device is an improvement, in that a single movement of the hand operates the locking device on both sides and the construction and form of locking device is such that it holds the reel in place, while at the same time, it provides a support for the hand in the coiling of the line and steadying the reel in winding.

The member E is easily turned upwards out of the way so that the reel can be lifted from the bracket and removed.

On the bracket is a dog D pivotally mounted and having its free end bent to engage the notches $b$ on the disks so that the free end of the line can be carried to the desired connection (being provided with any button or clip) and the tension of the line governed by winding the reel while the dog D rides on the disk.

Having described my invention what I claim as new and desire to secure by Letters Patent is In a device of the character described, a bracket, a reel removably mounted therein and having disks thereon notched each in opposite direction from the other, a dog engaging one of the disks to hold the reel from turning, by which combination the reel can be placed in the bracket for righthand or lefthand winding and held from unwinding, a member pivoted at each end in the bracket adjacent the journals of the reel therein and adapted to be swung over the reel journals to confine the reel in said bracket.

In testimony whereof I affix my signature in presence of two witnesses.

EDWARD F. WRENCH.

Witnesses:
 E. E. RISLEY,
 E. T. DE GIORGI.